US012608436B2

(12) United States Patent
Liu

(10) Patent No.: US 12,608,436 B2
(45) Date of Patent: Apr. 21, 2026

(54) PAGE SKIPPING METHOD AND APPARATUS, AND COMPUTER DEVICE AND STORAGE MEDIUM

(71) Applicant: Beijing Bytedance Network Technology Co., Ltd., Beijing (CN)

(72) Inventor: Yuxing Liu, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 217 days.

(21) Appl. No.: 18/565,191

(22) PCT Filed: Oct. 13, 2022

(86) PCT No.: PCT/CN2022/125165
§ 371 (c)(1),
(2) Date: Nov. 29, 2023

(87) PCT Pub. No.: WO2023/087991
PCT Pub. Date: May 25, 2023

(65) Prior Publication Data
US 2024/0220567 A1 Jul. 4, 2024

(30) Foreign Application Priority Data
Nov. 19, 2021 (CN) .......................... 202111409896.5

(51) Int. Cl.
*G06F 17/00* (2019.01)
*G06F 16/958* (2019.01)
(52) U.S. Cl.
CPC ................................. *G06F 16/958* (2019.01)
(58) Field of Classification Search
CPC .................................................. G06F 16/958
See application file for complete search history.

(56) References Cited

U.S. PATENT DOCUMENTS 11,301,203 B2 * 4/2022 Liao ...................... G06F 3/0484
11,606,620 B2 * 3/2023 Ren .................... H04N 21/4784
(Continued)

FOREIGN PATENT DOCUMENTS

CN        105068816 A * 11/2015
CN        106156066 A * 11/2016
(Continued)

OTHER PUBLICATIONS

CN106156066A, Wang, English translation, Nov. 23, 2016, pp. 1-36. (Year: 2016).*

(Continued)

*Primary Examiner* — Laurie A Ries
(74) *Attorney, Agent, or Firm* — Alleman Hall LLP

(57) ABSTRACT

A page skipping method and apparatus, and a computer device and a storage medium. The method comprises: displaying at least one card unit in a first page, wherein the card unit displays first content of a multimedia preview resource, and a size of the multimedia preview resource is greater than or equal to a size of the card unit; in response to a trigger operation for the card unit, moving the multimedia preview resource to a target area of a second page according to a preset movement effect; and displaying second content of the multimedia preview resource in the target area of the second page, and displaying, in another area of the second page, detail content corresponding to the multimedia preview resource, wherein the second content comprises the first content.

15 Claims, 4 Drawing Sheets

(56) References Cited

U.S. PATENT DOCUMENTS

| | | | | |
|---|---|---|---|---|
| 12,020,303 | B1 * | 6/2024 | Mithal | G06Q 30/0603 |
| 2004/0164975 | A1 * | 8/2004 | Ho | G06F 3/0483 |
| | | | | 345/204 |
| 2007/0073833 | A1 * | 3/2007 | Roy | H04L 67/02 |
| | | | | 709/217 |
| 2012/0017146 | A1 * | 1/2012 | Travieso | G06F 40/58 |
| | | | | 715/265 |
| 2012/0081375 | A1 * | 4/2012 | Robert | G06F 40/106 |
| | | | | 345/522 |
| 2013/0124342 | A1 * | 5/2013 | Virkar | G06Q 30/0241 |
| | | | | 705/14.73 |
| 2014/0136973 | A1 * | 5/2014 | Kumar | G06F 16/9574 |
| | | | | 715/274 |
| 2014/0289597 | A1 * | 9/2014 | Kim | G06F 40/143 |
| | | | | 715/205 |
| 2014/0365854 | A1 * | 12/2014 | Karunamuni | G06F 3/04883 |
| | | | | 715/777 |
| 2016/0275093 | A1 * | 9/2016 | Majoch | G06F 40/166 |
| 2016/0334973 | A1 * | 11/2016 | Reckhow | H04N 21/4312 |
| 2017/0339229 | A1 * | 11/2017 | Miller | G06F 16/70 |
| 2021/0011957 | A1 * | 1/2021 | Lenzner | G06F 16/9566 |
| 2022/0232288 | A1 * | 7/2022 | Ren | G06Q 50/01 |
| 2024/0019985 | A1 * | 1/2024 | Ye | G06F 3/04845 |

FOREIGN PATENT DOCUMENTS

| | | | | | | |
|---|---|---|---|---|---|---|
| CN | 107992465 | A | * | 5/2018 | .......... | G06F 40/166 |
| CN | 110909274 | A | * | 3/2020 | .......... | G06F 3/0483 |
| CN | 111242682 | A | | 6/2020 | | |
| CN | 112052415 | A | * | 12/2020 | .......... | G06F 3/0488 |
| CN | 112527287 | A | | 3/2021 | | |
| CN | 112989076 | A | | 6/2021 | | |
| CN | 113779465 | A | * | 12/2021 | .......... | G06F 40/186 |
| CN | 114201713 | A | | 3/2022 | | |

OTHER PUBLICATIONS

China National Intellectual Property Administration, Office Action and Search Report Issued in Application No. 202111409896.5, Aug. 1, 2023, 12 pages.

ISA China National Intellectual Property Administration, International Search Report Issued in Application No. PCT/CN2022/125165, Dec. 22, 2022, WIPO, 5 pages.

"The most comprehensive analysis in history: 4 methods to create-PPT marquee/marquee picture carousel animation," Zhuanlan-Zhihu, Available Online at zhuanlan.zhihu.com/p/347682646, Jan. 27, 2021, 46 pages.

* cited by examiner

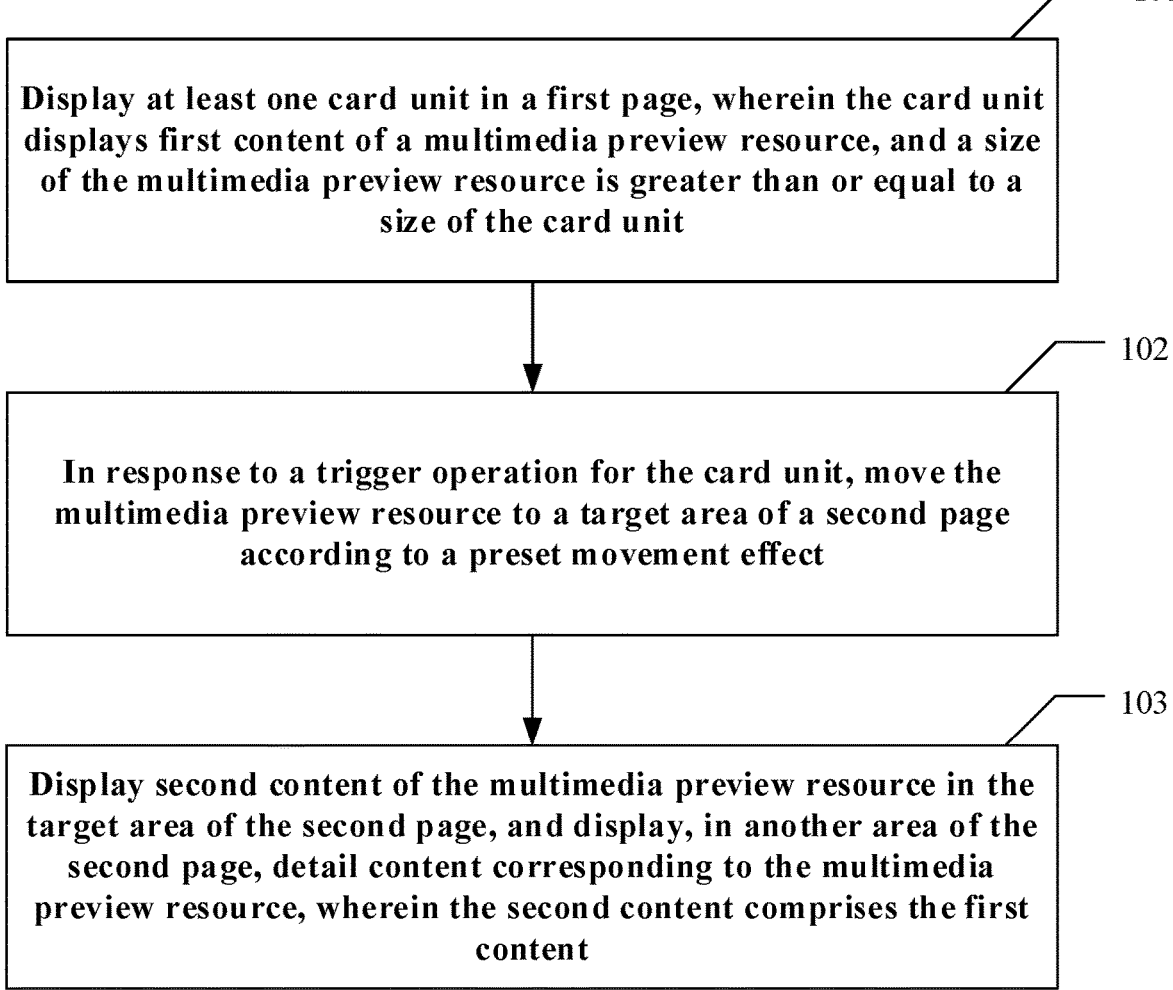

101

Display at least one card unit in a first page, wherein the card unit displays first content of a multimedia preview resource, and a size of the multimedia preview resource is greater than or equal to a size of the card unit

102

In response to a trigger operation for the card unit, move the multimedia preview resource to a target area of a second page according to a preset movement effect

103

Display second content of the multimedia preview resource in the target area of the second page, and display, in another area of the second page, detail content corresponding to the multimedia preview resource, wherein the second content comprises the first content

FIG. 1

First page                 Second page

301

In response to a trigger operation for the card unit, display a page frame corresponding to the second page

302

Determine a target area for the multimedia preview resource in the page frame, and move the multimedia preview resource to the target area according to the preset movement effect Multimedia
preview resource Target area Card unit

501

Acquire a display animation corresponding to the multimedia
preview resource

502

Play the display animation in the target area of the second page,
and display the second content of the multimedia preview resource
after the playing of the display animation

PAGE SKIPPING METHOD AND APPARATUS, AND COMPUTER DEVICE AND STORAGE MEDIUM

CROSS-REFERENCE TO RELATED APPLICATION(S)

This application is a national stage of the International application PCT/CN2022/125165, filed on Oct. 13, 2022. This International application claims priority to Chinese Application No. 202111409896.5, filed on Nov. 19, 2021. All of these applications are hereby incorporated by reference in their entireties.

FIELD

The present disclosure relates to the technical field of computers, and in particular, to a page skipping method and apparatus, a computer device, a storage medium, a computer program product, and a program.

BACKGROUND

At present, with the continuous development of Internet products, more and more people begin to use the Internet products, for example, use mobile phone applications (APPs) or personal computer (PC) webpages to browse related information.

During an information browsing process, information display is often performed via a plurality of pages. Along with the establishment of use habits and user cognition, the users are very familiar with page switching modes. However, in specific application scenarios, it may be necessary to increase an immersive feeling of the users, thus how to reduce the amplitude of page switching becomes an urgent problem to be solved.

SUMMARY

Embodiments of the present disclosure at least provide a page skipping method and apparatus, a computer device, a storage medium, a computer program product, and a program.

In a first aspect, embodiments of the present disclosure provides a method for page skipping, comprising:

displaying at least one card unit in a first page, wherein the card unit displays first content of a multimedia preview resource, and a size of the multimedia preview resource is greater than or equal to a size of the card unit;

in response to a trigger operation for the card unit, moving the multimedia preview resource to a target area of a second page according to a preset movement effect; and displaying second content of the multimedia preview resource in the target area of the second page, and displaying, in another area of the second page, detail content corresponding to the multimedia preview resource, wherein the second content comprises the first content.

In a possible embodiment, moving the multimedia preview resource to the target area of the second page according to the preset movement effect comprises:

moving the multimedia preview resource to the target area of the second page according to a preset movement path, and/or a preset movement mode, and/or a preset movement processing mode.

In a possible embodiment, a size of the target area is greater than the size of the card unit;

moving the multimedia preview resource to the target area of the second page according to the preset movement effect comprises:

in a case where the size of the multimedia preview resource is equal to the size of the card unit, performing zooming-in processing on the first content, and translating the first content to the target area of the second page according to a preset movement path; and completing the zooming-in processing when the multimedia preview resource is moved to the target area, wherein the first content after the zooming-in processing is the second content.

In a possible embodiment, moving the multimedia preview resource to the target area of the second page according to the preset movement effect comprises:

in a case where the size of the multimedia preview resource is greater than the size of the card unit, gradually displaying, during a process of translation according to a preset movement path, content other than the first content in the multimedia preview resource, wherein, content being displayed when the multimedia preview resource is moved to the target area is the second content of the multimedia preview resource.

In a possible embodiment, moving the multimedia preview resource to the target area of the second page according to the preset movement effect comprises:

acquiring a display animation corresponding to the multimedia preview resource; and playing the display animation in the target area of the second page, and displaying the second content of the multimedia preview resource after the playing of the display animation ends.

In a possible embodiment, in response to the trigger operation for the card unit, moving the multimedia preview resource to the target area of the second page according to the preset movement effect, comprises:

in response to the trigger operation for the card unit, displaying a page frame corresponding to the second page; and determining a target area in the page frame for the multimedia preview resource, and moving the multimedia preview resource to the target area according to the preset movement effect, wherein, the page frame, the second content and the detail content corresponding to the multimedia preview resource constitute the second page.

In a possible embodiment, in a case where the multimedia preview resource comprises an image, the method further comprises: determining the preset movement path for the multimedia preview resource according to the following method:

determining motion information corresponding to an entity in the image; and determining, among a plurality of preset movement paths, a preset movement path matching the motion information as the preset movement path for the multimedia preview resource.

In a possible embodiment, in a case where the multimedia preview resource is a book introduction, displaying the second content of the multimedia preview resource in the target area of the second page, and displaying, in the another area of the second page, the detail content corresponding to the multimedia preview resource, comprises:

displaying the book introduction in the target area of the second page, and displaying, in the another area of the second page, chapter content of a target book corresponding to the book introduction.

In a second aspect, embodiments of the present disclosure further provides an apparatus for page skipping, comprising:

a first display module, configured to display at least one card unit in a first page, wherein the card unit displays first content of a multimedia preview resource, and a size of the multimedia preview resource is greater than or equal to a size of the card unit;

a response module, configured to: in response to a trigger operation for the card unit, move the multimedia preview resource to a target area of a second page according to a preset movement effect; and a second display module, configured to display second content of the multimedia preview resource in the target area of the second page, and display, in another area of the second page, detail content corresponding to the multimedia preview resource, wherein the second content comprises the first content.

In a possible embodiment, when moving the multimedia preview resource to the target area of the second page according to the preset movement effect, the response module is configured to:

move the multimedia preview resource to the target area of the second page according to a preset movement path, and/or a preset movement mode, and/or a preset movement processing mode.

In a possible embodiment, a size of the target area is greater than the size of the card unit;

when moving the multimedia preview resource to the target area of the second page according to the preset movement effect, the response module is configured to:

in a case where the size of the multimedia preview resource is equal to the size of the card unit, perform zooming-in processing on the first content, and translate the first content to the target area of the second page according to the preset movement path; and complete the zooming-in processing when the multimedia preview resource is moved to the target area, wherein the first content after the zooming-in processing is the second content.

In a possible embodiment, when moving the multimedia preview resource to the target area of the second page according to the preset movement effect, the response module is configured to:

in a case where the size of the multimedia preview resource is greater than the size of the card unit, gradually display content other than the first content in the multimedia preview resource during the process of performing translation according to the preset movement path, wherein, the content being displayed when the multimedia preview resource is moved to the target area is the second content of the multimedia preview resource.

In a possible embodiment, when moving the multimedia preview resource to the target area of the second page according to the preset movement effect, the response module is configured to:

acquire a display animation corresponding to the multimedia preview resource; and play the display animation in the target area of the second page, and display the second content of the multimedia preview resource after the playing of the display animation ends.

In a possible embodiment, in response to the trigger operation for the card unit, when moving the multimedia preview resource to the target area of the second page according to the preset movement effect, the response module is configured to:

in response to the trigger operation for the card unit, display a page frame corresponding to the second page; and determine a target area of the multimedia preview resource in the page frame, and move the multimedia preview resource to the target area according to the preset movement effect, wherein, the page frame, the second content and the detail content corresponding to the multimedia preview resource constitute the second page.

In a possible embodiment, in a case where the multimedia preview resource comprises an image, the response module is further configured to determine the preset movement path for the multimedia preview resource according to the following method:

determining motion information corresponding to an entity in the image; and determining, as the preset movement path for the multimedia preview resource, a preset movement path matching the motion information among a plurality of preset movement paths.

In a possible embodiment, in a case where the multimedia preview resource is a book introduction, when displaying the second content of the multimedia preview resource in the target area of the second page, and displaying, in another area of the second page, detail content corresponding to the multimedia preview resource, the second display module is configured to:

display the book introduction in the target area of the second page, and display, in another area of the second page, chapter content of a target book corresponding to the book introduction.

In a third aspect, embodiments of the present disclosure further provides a computer device, comprising: a processor, a memory and a bus, wherein the memory stores a machine-readable instruction executable by the processor, and when the computer device is running, the processor communicates with the memory via the bus, and when executed by the processor, the machine-readable instruction executes the steps in the first aspect or any possible embodiments in the first aspect.

In a fourth aspect, embodiments of the present disclosure further provides a computer-readable storage medium, wherein a computer program is stored on the computer-readable storage medium, when executed by a processor, the computer program executes the steps in the first aspect or any possible embodiment in the first aspect.

In a fifth aspect, embodiments of the present disclosure further provides a computer program product, comprising a computer program, wherein when executed by a processor, the computer program executes the steps in the first aspect or any possible embodiment in the first aspect.

In a sixth aspect, embodiments of the present disclosure further provides a computer program, wherein when executed by a processor, the computer program executes the steps in the first aspect or any possible embodiments in the first aspect.

In order to make the above objectives, features and advantages of the present disclosure more comprehensible, preferred embodiments are described in detail below in combination with the drawings.

BRIEF DESCRIPTION OF THE DRAWINGS

To illustrate technical solutions in the embodiments of the present disclosure more clearly, a brief introduction on the drawings which are needed in the description of the embodiments is given below, the drawings herein are incorporated in and constitute a part of the present specification, and these drawings illustrate embodiments conforming to the present disclosure, and together with the specification, serve to explain the technical solutions of the present disclosure. It should be understood that the following drawings illustrate only some embodiments of the present disclosure, and therefore should not be considered as a limitation to the scope. Those ordinary skilled in the art may also obtain other related drawings according to these drawings without any inventive effort.

FIG. 1 illustrates a flowchart of a method for page skipping provided in embodiments of the present disclosure;

DETAILED DESCRIPTION OF EMBODIMENTS

Figure 2:
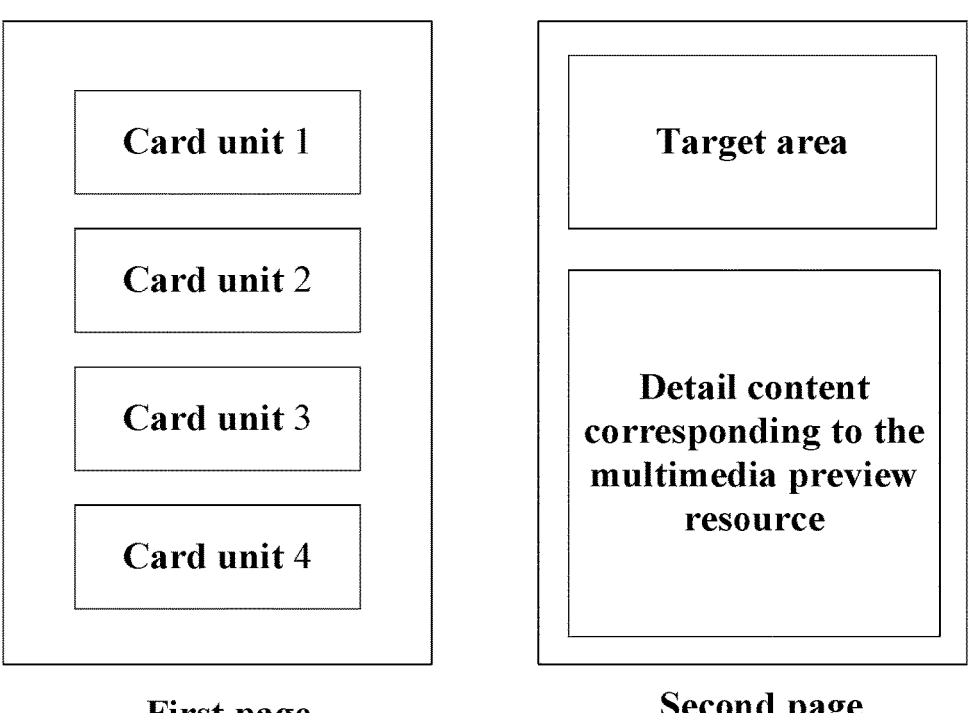
FIG. 2 illustrates a schematic diagram of a first page and a second page in a method for page skipping provided in embodiments of the present disclosure.

In order to make the objectives, technical solutions and advantages of the embodiments of the present disclosure clearer, a clear and complete description of the technical solutions in the embodiments of the present disclosure will be given below, in combination with the drawings in the embodiments of the present disclosure. Apparently, the embodiments described below are merely a part, but not all, of the embodiments of the present disclosure. Components of the embodiments of the present disclosure generally described and illustrated herein may be arranged and designed in a variety of different configurations. Therefore, the following detailed description of the embodiments of the present disclosure is not intended to limit the scope of the present disclosure as claimed, but merely represents a selected embodiment of the present disclosure. All of other embodiments, obtained by those ordinary skilled in the art based on the embodiments in the present disclosure without any creative effort, fall into the protection scope of the present disclosure.

Studies find that, in the prior art, when a user browses information, information display is often performed through a plurality of pages, resulting in a low immersive feeling during reading of page content, and the amplitude of the action of page switching is relatively large. The switching is more abrupt in a specific scenario where the immersive feeling needs to be improved.

Based on the above studies, according to a page skipping method and apparatus, a computer device and a storage medium provided in the embodiments of the present disclosure, at least one card unit may be displayed in a first page, and the card unit displays first content of a multimedia preview resource. When a trigger operation for the card unit is detected, the multimedia preview resource may be moved to a target area of a second page according to a preset movement effect. Second content of the multimedia preview resource is displayed in the target area of the second page. In this way, the user can feel visually the movement of content instead of the skipping of pages, such that the perception of the user for page skipping can be reduced, and the immersive feeling of the user in a content browsing process is improved.

The defects existing in the above solutions are results obtained by the inventor after practice and careful researches, therefore the discovery process of the above problems and solutions proposed for the above problems in the present disclosure below should all fall into contributions made by the inventor to the present disclosure during the process of the present disclosure.

It should be noted that similar reference signs and letters represent similar items in the following figures, therefore, once a certain item is defined in one figure, there is no need to further define and interpret it in the subsequent figures.

In order to facilitate the understanding of the present embodiment, firstly, a method for page skipping disclosed in the embodiments of the present disclosure is described in detail, and an execution body of the page skipping method provided in the embodiments of the present disclosure is generally a terminal device having a certain computing capability, and the terminal device may comprise, for example, a smart phone, a tablet computer, a personal computer, and the like.

Referring to FIG. 1, it is a flowchart of a method for page skipping provided in embodiments of the present disclosure, and the method comprises step 101 to step 103:

Step 101: displaying at least one card unit in a first page, wherein the card unit displays first content of a multimedia preview resource, and a size of the multimedia preview resource is greater than or equal to a size of the card unit;

step 102: in response to a trigger operation for the card unit, moving the multimedia preview resource to a target area of a second page according to a preset movement effect; and step 103: displaying second content of the multimedia preview resource in the target area of the second page, and displaying, in another area of the second page, detail content corresponding to the multimedia preview resource, wherein the second content comprises the first content.

The method may be applied in scenarios such as a feed flow, and when the user reads a cartoon, an article, or views an audio/video, step 101 to step 103 may be executed. Specifically, the first page and the second page to be skipped display the same multimedia preview resource together, and the two pages are associated with each other through the multimedia preview resource. In response to the trigger operation, the first page is switched to the second page with the preset movement effect as a transition. By using the same display content to establish a connection, the perception of the user for page skipping can be reduced, such that the immersive experience of the user in the feed flow scenario is improved.

Steps 101 to 103 will be described in detail below.

For step 101,

In a possible embodiment, as shown in FIG. 2, the first page is a list display page, the first page displays a plurality of card units, and different card units display different multimedia preview resources. The multimedia preview resources comprise preview resources of multimedia resources of a variety of types, and exemplarily may comprise books, music, image-text, videos, and the like.

The card unit is used for displaying first content of the multimedia preview resource, wherein the first content may be some or all content of the multimedia preview resource. Based on different types of the multimedia resources corresponding to the multimedia preview resource, display forms of the first content may be different.

Exemplarily, when the multimedia resource corresponding to the multimedia preview resource is a video, the multimedia preview resource may be a certain video clip or a video cover of the video or the like. When the multimedia resource corresponding to the multimedia preview resource is an image-text, the multimedia preview resource may be one of a plurality of drawings or a text title, an abstract of an article, or the like. When the multimedia resource corresponding to the multimedia preview resource is an audio, the multimedia preview resource may be one of a plurality of related images, for example, an album cover, or the like. When the multimedia resource corresponding to the multimedia preview resource is a book, the multimedia preview resource may be a book cover.

In a possible embodiment, when a size of the multimedia preview resource is greater than a size of the card unit, the first content of the multimedia preview resource is some of the content in the multimedia preview resource; and when the size of the multimedia preview resource is equal to the size of the card unit, the first content of the multimedia preview resource is all of the content of the multimedia preview resource.

Specifically, when the size of the multimedia preview resource is greater than the size of the card unit, and when the first content of the multimedia preview resource is displayed, since the multimedia preview resource cannot be completely displayed, the content of the multimedia preview resource is properly reduced. For example, when the displayed multimedia preview resource is text content, the text content is appropriately deleted; and when the displayed multimedia preview resource is an image, the image is properly cut or reduced to a proper proportion. For example, if an image proportion is 4:3 and a card proportion is 16:9, the original 4:3 image may be stretched to 16:9 to adapt to the display proportion.

When the size of the multimedia preview resource is less than the size of the card unit, in a possible embodiment, the first content of the multimedia preview resource is all of the content of the multimedia preview resource, and the multimedia preview resource may be directly displayed on the card unit. Alternatively, in another possible embodiment, the multimedia preview resource may be zoomed-in, and the zoomed-in multimedia preview resource is used as the first content to be displayed on the card unit.

Figure 3:
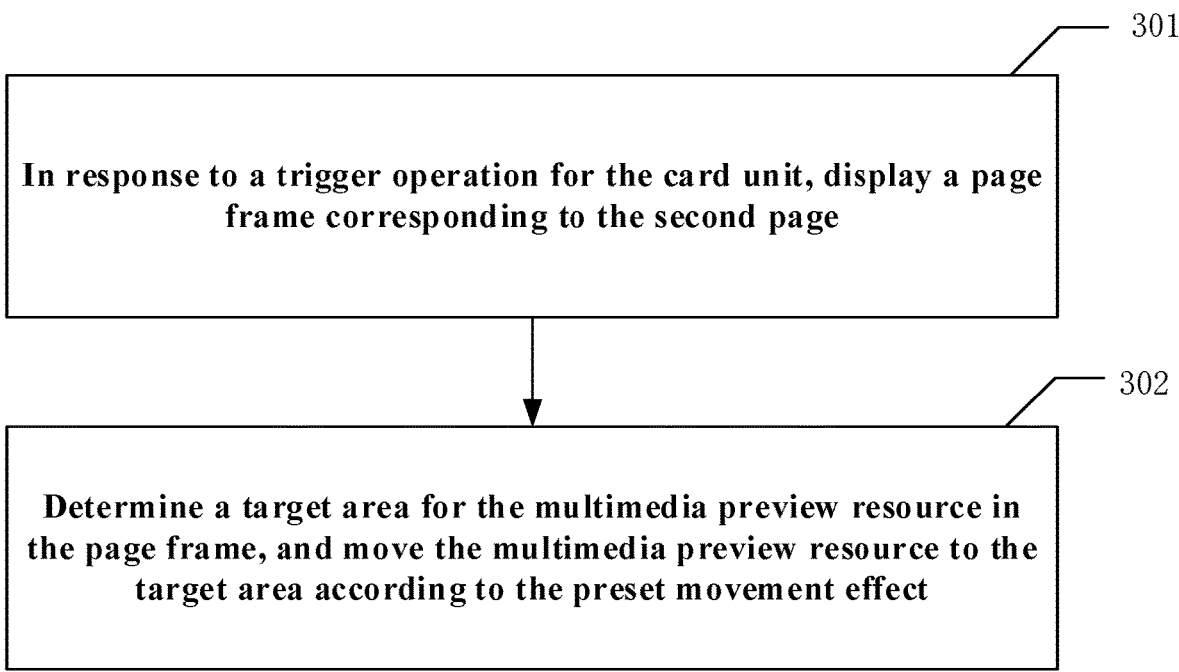
FIG. 3 illustrates a flowchart of a specific method for moving a multimedia preview resource to a target area of a second page in a method for page skipping provided in embodiments of the present disclosure.

For step 102,

In a possible embodiment, in response to a trigger operation for the card unit, moving the multimedia preview resource to the target area of the second page according to the preset movement effect may comprise step 301 to step 302 according to the method as shown in FIG. 3:

step 301: in response to a trigger operation for the card unit, displaying a page frame corresponding to the second page.

Here, the page frame comprises a display position of each piece of content and fixed display content. Exemplarily, the fixed display content comprises a page boundary, an area boundary, or the like. In a possible embodiment, the page frame may be pre-loaded on a user side. After the trigger operation for any card unit is detected, the pre-loaded page frame may be displayed directly, thereby reducing the waiting time for loading.

In a possible embodiment, since the types of the multimedia resources corresponding to the multimedia preview resources displayed on the card unit are different, after different card units are triggered, different page frames may be displayed.

Exemplarily, if the multimedia preview resource displayed on a card unit A is a video, a page frame 1 may be displayed after the card A is triggered; and if the multimedia preview resource displayed on a card unit B is image-text content, a page frame 2 may be displayed after the card unit B is triggered.

By determining a page frame to be displayed according to the type of the multimedia resource, it can be ensured that when the multimedia resources of the same type are loaded, the display requirement corresponding to the resource type can be met.

Step 302: determining a target area in the page frame for the multimedia preview resource, and moving the multimedia preview resource to the target area according to the preset movement effect.

In a possible embodiment, the target area may be preset in the page frame. Exemplarily, as shown in FIG. 2, the first content of the displayed multimedia preview resource is image content. After the trigger operation for the card unit in a list is responded, in order to highlight some content in the image content, the multimedia preview resource is moved to the topmost side of the second page for display.

In a possible embodiment, moving the multimedia preview resource to the target area of the second page according to the preset movement effect may exemplarily comprise: moving the multimedia preview resource to the target area of the second page according to a preset movement path, and/or a preset movement mode, and/or a preset movement processing mode.

The preset movement path is a path required for the triggered card unit to move from the current position area to the target area. Exemplarily, the preset movement path is a path for linearly moving the card from the current position to the target area. The preset movement mode is a movement mode required for the triggered card unit in the movement process, and for example, may comprise fly-in, fade-in, fade-out, or the like. The preset movement processing mode is a processing mode required for the unit card in the movement process, and for example, may comprise zooming-in, zooming-out, or the like.

In a possible embodiment, there may be a plurality of preset movement paths. In a case where the multimedia preview resource comprises an image, motion information corresponding to an entity in the image may be determined preferentially, and then a preset movement path matching the motion information among the plurality of preset movement paths is used as the preset movement path for the multimedia preview resource.

Exemplarily, the entity in the image is a person, and the motion information corresponding to the entity may be a person action, which for example may be running, jumping or the like. When determining the preset movement path matching the motion information, a movement path with a corresponding direction the same as a motion direction of the person action may be used as the preset movement path matching the motion information.

Exemplarily, when the person in the image content generates an upward jumping action, an upward movement path is used as the preset movement path matching the motion information. The multimedia preview resource may be moved upwards through the preset movement effect until it arrives at the target area of the second page.

In a possible embodiment, a size of the target area is greater than the size of the card unit. When the size of the multimedia preview resource is equal to the size of the card unit, and when the multimedia preview resource is moved to the target area of the second page according to the preset movement effect, the first content may be zoomed-in, and is translated to the target area of the second page according to the preset movement path. The zooming-in processing is completed when the multimedia preview resource is moved to the target area, and the first content after the zooming-in processing is the second content in step 103.

If the size of the target area is smaller than the size of the card unit, when the size of the multimedia preview resource is equal to the size of the card unit, and when the multimedia preview resource is moved to the target area of the second page according to the preset movement effect, the first content can be zoomed-out, and is translated to the target area of the second page according to the preset movement path. The zooming-out processing is completed when the multimedia preview resource is moved to the target area, and the first content after the zooming-out processing is the second content in step 103.

If the size of the target area is equal to the size of the card unit, when the size of the multimedia preview resource is equal to the size of the card unit, and when the multimedia preview resource is moved to the target area of the second page according to the preset movement effect, the first content (i.e., the multimedia preview resource) may be directly translated to the target area of the second page according to the preset movement path. The first content is the same as the second content in step 103, and both are the multimedia preview resource.

In another possible embodiment, in a case where the size of the multimedia preview resource is greater than the size of the card unit, at this time, the first content displayed by the content card is some of the content of the multimedia preview resource. During a process of translation according to the preset movement path, content other than the first content in the multimedia preview resource may be gradually displayed. The content being displayed when the multimedia preview resource is moved to the target area is the second content of the multimedia preview resource.

Here, if the size of the target area is greater than or equal to the size of the multimedia preview resource, the second content is all of the content of the multimedia preview resource; and if the size of the target area is less than the size of the multimedia preview resource, the second content is some of the content of the multimedia preview resource, and the some of the content comprises the first content.

Figure 4:
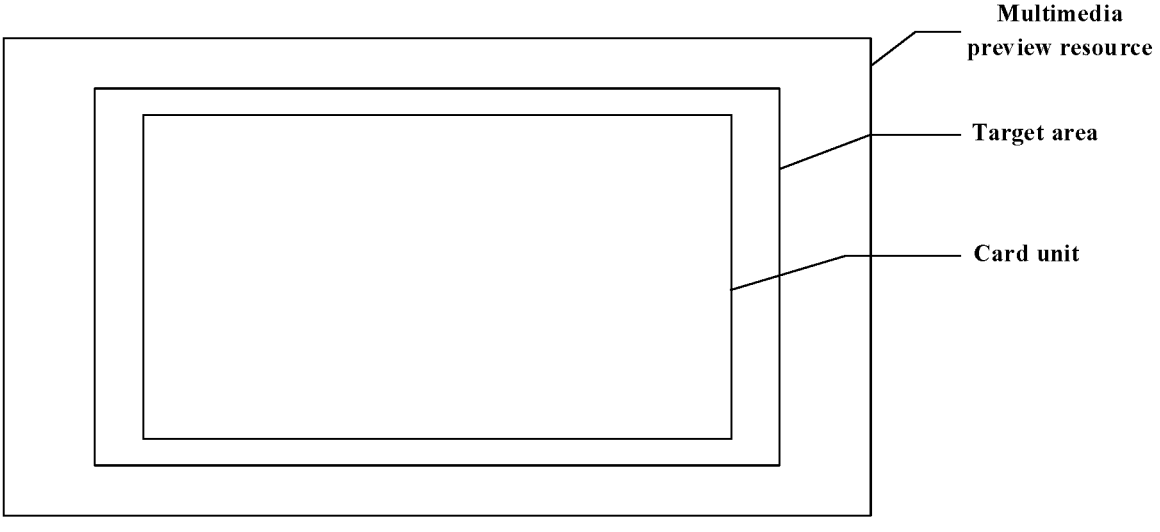
FIG. 4 illustrates a size relationship diagram of first content and second content provided in embodiments of the present disclosure.

Exemplarily, in a case where the size of the multimedia preview resource is greater than the size of the target area, and the size of the target area is greater than the size of the card unit, and the multimedia preview resource is an image, the relationship among the multimedia preview resource, the first content and the second content may be as shown in FIG. 4.

In another possible embodiment, the preset movement effect comprises a display animation. When the multimedia preview resource is moved to the target area of the second page, the second content may be displayed in the target area in the form of a content replacing animation. As such, the perception of the user for the content difference between the first content of the multimedia preview resource displayed on the card unit and the second content of the multimedia preview resource displayed in the target area of the second page can be desalinated. Thus the transition is more natural.

Figure 5:
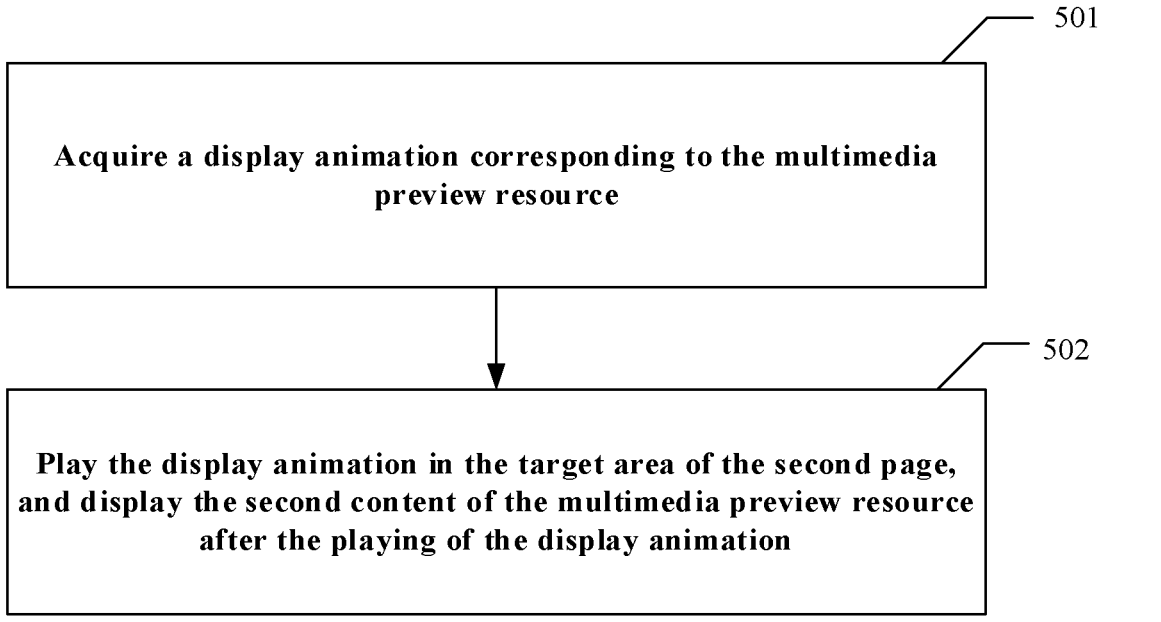
FIG. 5 illustrates a flowchart of displaying second content in a method for page skipping provided in embodiments of the present disclosure.

Exemplarily, the method as shown in FIG. 5 may be used, and the method may comprise step 501 to step 502:

Step 501: acquiring a display animation corresponding to the multimedia preview resource; and step 502: playing the display animation in the target area of the second page, and displaying the second content of the multimedia preview resource after the playing of the display animation.

The display animation may be translation, fade-in, fade-out or the like. A special animation may be used as an attraction point to the user, such that the perception of the user for the transition of the pages is reduced. Exemplarily, in response to the trigger operation for the card unit, the first content of the multimedia preview resource fades out of the page display area at first; and then, the second content of the multimedia preview resource is displayed on a target layout position of the second page in a fade-in manner, so as to skip from the first page to the second page.

For step 103,

In a possible embodiment, the second page comprises the page frame, the second content, and the detail content corresponding to the multimedia preview resource.

The target area of the second page is used for displaying the second content of the multimedia preview resource, and another area of the second page is used for displaying the detail content corresponding to the multimedia preview resource. As such, the multimedia preview resource is supplemented, and the user can have a complete understanding of the displayed content.

In a possible embodiment, after any card unit is displayed in the first page, the multimedia resource of the multimedia preview resource of the card unit, i.e., the detail content, may be pre-loaded directly. That is, after the card unit is triggered, the detail content may be directly loaded in another area of the second page. Alternatively, after any card unit is triggered, the detail content corresponding to the multimedia preview resource of the card unit is acquired, and the acquired detail content is loaded on other resources of the second page.

In a possible embodiment, in a case where the multimedia preview resource is a book introduction, displaying the second content of the multimedia preview resource in the target area of the second page, and displaying, in another area of the second page, the detail content corresponding to the multimedia preview resource, may refer to: displaying the book introduction in the target area of the second page, and displaying, in another area of the second page, chapter content of a target book corresponding to the book introduction, wherein the book introduction may be presented in the form of a text or an image.

By means of the above method, at least one card unit may be displayed in the first page, and the card unit displays the first content of the multimedia preview resource. When a trigger operation for the card unit is detected, the multimedia preview resource may be moved to a target area of the second page according to a preset movement effect. The second content of the multimedia preview resource is displayed in the target area of the second page. In this way, the user can visually feel only the movement of content rather than the skipping of pages, thus the perception of the user for page skipping can be reduced, and the immersive feeling of the user in the content browsing process is improved.

It will be understood by those skilled in the art that, in the above specific embodiments of the method, the writing sequence of each step does not mean a strict execution sequence to constitute any limitation on the embodiment process, and the specific execution sequence of each step should be determined by its function and possible internal logic.

Based on the same inventive concept, embodiments of the present disclosure further provides an apparatus for page skipping corresponding to the method for page skipping. Since the principles of the apparatus for solving problems in the embodiment of the present disclosure are similar to those of the page skipping method in the embodiment of the present disclosure, the embodiment of the apparatus may refer to the embodiment of the method, and thus details are not described again.

Figure 6:
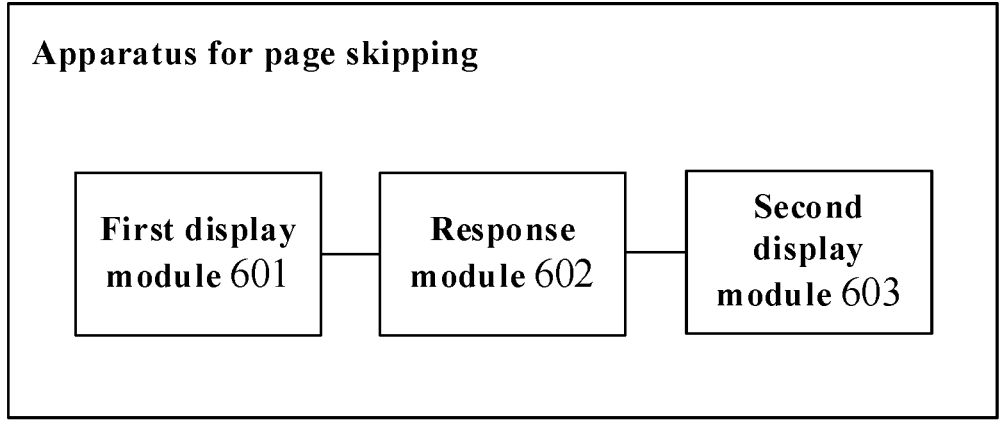
FIG. 6 illustrates a schematic architectural diagram of an apparatus for page skipping provided in embodiments of the present disclosure.

Referring to FIG. 6, it is a schematic architectural diagram of an apparatus for page skipping provided in embodiments of the present disclosure, the apparatus comprises: a first display module 601, a response module 602, and a second display module 603, wherein, the first display module 601 is configured to display at least one card unit in a first page, wherein the card unit displays first content of a multimedia preview resource, and a size of the multimedia preview resource is greater than or equal to a size of the card unit;

the response module 602 is configured to: in response to a trigger operation for the card unit, move the multimedia preview resource to a target area of a second page according to a preset movement effect; and the second display module 603 is configured to display second content of the multimedia preview resource in the target area of the second page, and display, in another area of the second page, detail content corresponding to the multimedia preview resource, wherein the second content comprises the first content.

In a possible embodiment, when moving the multimedia preview resource to the target area of the second page according to the preset movement effect, the response module 602 is configured to:

move the multimedia preview resource to the target area of the second page according to a preset movement path, and/or a preset movement mode, and/or a preset movement processing mode.

In a possible embodiment, a size of the target area is greater than the size of the card unit;

when moving the multimedia preview resource to the target area of the second page according to the preset movement effect, the response module 602 is configured to:

in a case where the size of the multimedia preview resource is equal to the size of the card unit, perform zooming-in processing on the first content, and translate the first content to the target area of the second page according to the preset movement path; and complete the zooming-in processing when the multimedia preview resource is moved to the target area, wherein the first content after the zooming-in processing is the second content.

In a possible embodiment, when moving the multimedia preview resource to the target area of the second page according to the preset movement effect, the response module 602 is configured to:

in a case where the size of the multimedia preview resource is greater than the size of the card unit, gradually display content other than the first content in the multimedia preview resource during a process of translation according to the preset movement path, wherein, the content being displayed when the multimedia preview resource is moved to the target area is the second content of the multimedia preview resource.

In a possible embodiment, when moving the multimedia preview resource to the target area of the second page according to the preset movement effect, the response module 602 is configured to:

acquire a display animation corresponding to the multimedia preview resource; and play the display animation in the target area of the second page, and display the second content of the multimedia preview resource after the playing of the display animation ends.

In a possible embodiment, in response to the trigger operation for the card unit, when moving the multimedia preview resource to the target area of the second page according to the preset movement effect, the response module 602 is configured to:

in response to the trigger operation for the card unit, display a page frame corresponding to the second page; and determine a target area in the page frame for the multimedia preview resource, and move the multimedia preview resource to the target area according to the preset movement effect, wherein, the page frame, the second content and the detail content corresponding to the multimedia preview resource constitute the second page.

In a possible embodiment, in a case where the multimedia preview resource comprises an image, the response module 602 is further configured to determine the preset movement path for the multimedia preview resource according to the following:

determining motion information corresponding to an entity in the image; and determining, as the preset movement path for the multimedia preview resource, a preset movement path matching the motion information among a plurality of preset movement paths.

In a possible embodiment, in a case where the multimedia preview resource is a book introduction, when displaying the second content of the multimedia preview resource in the target area of the second page, and displaying, in another area of the second page, detail content corresponding to the multimedia preview resource, the second display module 603 is configured to:

display the book introduction in the target area of the second page, and display, in the another area of the second page, chapter content of a target book corresponding to the book introduction.

With regard to the description of the processing flow of each module in the apparatus and the interaction process between the modules, reference may be made to the related description in the foregoing method embodiments, and thus details are not described in detail herein.

Figure 7:
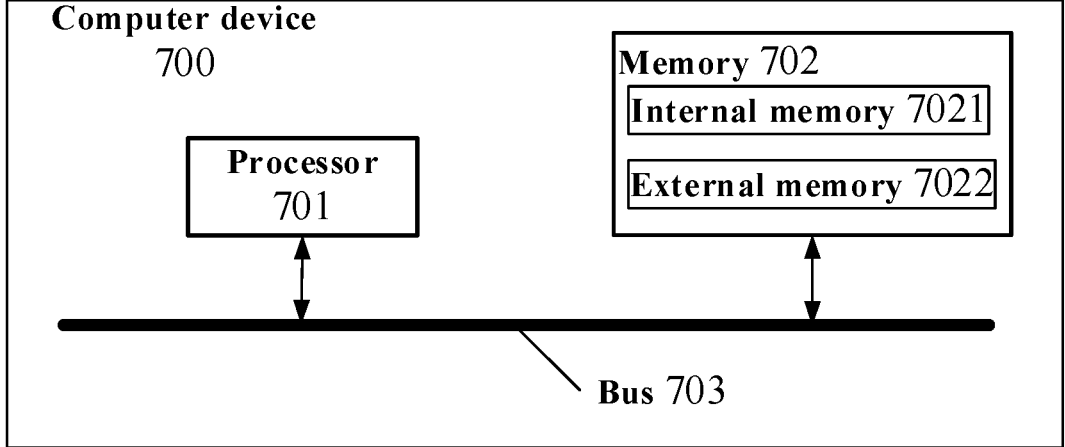
FIG. 7 illustrates a schematic structural diagram of a computer device provided in embodiments of the present disclosure.

Based on the same technical concept, an embodiment of the present disclosure further provides a computer device. Referring to FIG. 7, it is a schematic structural diagram of a computer device 700 provided in an embodiment of the present disclosure, wherein the computer device comprises: a processor 701, a memory 702 and a bus 703. The memory 702 is used for storing an execution instruction, and comprises an internal memory 7021 and an external memory 7022; the internal memory 7021 herein is also referred to as an internal storage, which is used for temporarily storing operation data in the processor 701 and data exchanged with the external memory 622 such as a hard disk. The processor

701 exchanges data with the external memory 7022 through the internal memory 7021, and when the computer device 700 is running, the processor 701 communicates with the memory 702 through the bus 703, so that the processor 701 executes the following instructions:

displaying at least one card unit in a first page, wherein the card unit displays first content of a multimedia preview resource, and a size of the multimedia preview resource is greater than or equal to a size of the card unit;

in response to a trigger operation for the card unit, moving the multimedia preview resource to a target area of a second page according to a preset movement effect; and displaying second content of the multimedia preview resource in the target area of the second page, and displaying, in another area of the second page, detail content corresponding to the multimedia preview resource, wherein the second content comprises the first content.

In a possible embodiment, among the instructions executed by the processor 701, moving the multimedia preview resource to the target area of the second page according to the preset movement effect comprises:

moving the multimedia preview resource to the target area of the second page according to a preset movement path, and/or a preset movement mode, and/or a preset movement processing mode.

In a possible embodiment, among the instructions executed by the processor 701, a size of the target area is greater than the size of the card unit;

moving the multimedia preview resource to the target area of the second page according to the preset movement effect comprises:

in a case where the size of the multimedia preview resource is equal to the size of the card unit, performing zooming-in processing on the first content, and translating the first content to the target area of the second page according to the preset movement path; and completing the zooming-in processing when the multimedia preview resource is moved to the target area, wherein the first content after the zooming-in processing is the second content.

In a possible embodiment, among the instructions executed by the processor 701, moving the multimedia preview resource to the target area of the second page according to the preset movement effect comprises:

in a case where the size of the multimedia preview resource is greater than the size of the card unit, gradually displaying content other than the first content in the multimedia preview resource during a process of translation according to the preset movement path, wherein, the content being displayed when the multimedia preview resource is moved to the target area is the second content of the multimedia preview resource.

In a possible embodiment, among the instructions executed by the processor 701, moving the multimedia preview resource to the target area of the second page according to the preset movement effect comprises:

acquiring a display animation corresponding to the multimedia preview resource; and playing the display animation in the target area of the second page, and displaying the second content of the multimedia preview resource after the playing of the display animation ends.

In a possible embodiment, among the instructions executed by the processor 701, in response to the trigger operation for the card unit, moving the multimedia preview resource to the target area of the second page according to the preset movement effect, comprises:

in response to the trigger operation for the card unit, displaying a page frame corresponding to the second page; and determining a target area in the page frame for the multimedia preview resource, and moving the multimedia preview resource to the target area according to the preset movement effect, wherein, the page frame, the second content and the detail content corresponding to the multimedia preview resource constitute the second page.

In a possible embodiment, among the instructions executed by the processor 701, in a case where the multimedia preview resource comprises an image, the method further comprises: determining the preset movement path for the multimedia preview resource according to the following:

determining motion information corresponding to an entity in the image; and determining, as the preset movement path for the multimedia preview resource, a preset movement path matching the motion information among a plurality of preset movement paths.

In a possible embodiment, among the instructions executed by the processor 701, in a case where the multimedia preview resource is a book introduction, the step: displaying the second content of the multimedia preview resource in the target area of the second page, and displaying, in another area of the second page, the detail content corresponding to the multimedia preview resource, comprises:

displaying the book introduction in the target area of the second page, and displaying, in another area of the second page, chapter content of a target book corresponding to the book introduction.

Embodiments of the present disclosure further provides a computer-readable storage medium, wherein a computer program is stored on the computer-readable storage medium, and when operated by a processor, the computer program executes the steps of the page skipping method in the above method embodiments. The storage medium may be a volatile or non-volatile computer-readable storage medium.

Embodiments of the present disclosure further provides a computer program product, wherein the computer program product carries a program code, an instruction comprised in the program code may be used for executing the steps of the page skipping method in the above method embodiments, specific reference may be made to the above method embodiments, and thus details are not described herein again.

The computer program product may be specifically implemented by hardware, software, or a combination thereof. In an optional embodiment, the computer program product is specifically embodied as a computer storage medium, and in another optional embodiment, the computer program product is specifically embodied as a software product, such as a software development kit (SDK), etc.

Embodiments of the present disclosure further provides a computer program, wherein when executed by a processor, the computer program implements the steps of the page skipping method in the above method embodiments.

Those skilled in the art to which the present disclosure belongs can clearly understand that, for the convenience and brevity of description, with regard to the specific working process of the system and apparatus described above, reference may be made to the corresponding process in the

15 foreging method embodiments, and thus details are not described herein again. In the several embodiments provided in the present disclosure, it should be understood that, the disclosed system, apparatus and method may be implemented in other manners. The apparatus embodiments described above are merely exemplary, for example, the division of the units is only a logic function division, there may be other division manners in practical embodiments, as another example, a plurality of units or components may be combined or integrated to another system, or some features may be omitted or not implemented. From another point of view, the displayed or discussed mutual coupling or direct coupling or communication connection may be indirect coupling or communication connection of apparatuses or units through some communication interfaces, and may be in electrical, mechanical or other forms.

The units described as separate components may be separated physically or not, components displayed as units may be physical units or not, namely, may be located in one place, or may be distributed on a plurality of network units. A part of or all of the units may be selected to implement the purposes of the solutions in the present embodiment according to actual demands.

In addition, the functional units in various embodiments of the present disclosure may be integrated in a processing unit, or the units individually exist physically, or two or more units are integrated in one unit.

If a function is implemented in the form of a software functional unit and is sold or used as an independent product, it may be stored in a non-volatile computer-readable storage medium executable by a processor. Based on this understanding, the technical solutions of the present disclosure substantially, or the part contributing to the prior art, or some technical solutions may be implemented in the form of a software product, the computer software product is stored in a storage medium, and comprises several instructions for enabling a computer device (which may be a personnel computer, a server, or a network device or the like) to execute all or part of the steps of the method in various embodiments of the present disclosure. The foregoing storage medium comprises a variety of media capable of storing program codes, such as a USB disk, a mobile hard disk, a read-only memory (ROM), a random access memory (RAM), a magnetic disk, or an optical disk.

Finally, it should be noted that, the embodiments described above are merely specific embodiments of the present disclosure, and are used to illustrate the technical solutions of the present disclosure instead of limiting the same. The protection scope of the present disclosure is not limited thereto, although the present disclosure has been described in detail with reference to the foregoing embodiments, those ordinary skilled in the art should understand that, any skilled familiar with this art may modify or easily conceive of changing the technical solutions recited in the foregoing embodiments, or equivalently replace some of the technical features therein; and these modifications, changes or substitutions do not make the nature of the corresponding technical solutions depart from the spirit and scope of the technical solutions of the embodiments of the present disclosure, and shall fall within the protection scope of the present disclosure. Therefore, the protection scope of the present disclosure shall be subject to the protection scope of the claims.

What is claimed is:

1. A method for page skipping, comprising:
displaying at least one card unit in a first page, wherein the card unit displays first content of a multimedia preview resource, and a size of the multimedia preview resource is greater than or equal to a size of the card unit;
in response to a trigger operation for the card unit, moving the multimedia preview resource to a target area of a second page according to a preset movement effect; and
displaying second content of the multimedia preview resource in the target area of the second page, and displaying, in another area of the second page, detail content corresponding to the multimedia preview resource, wherein the second content comprises the first content,
wherein moving the multimedia preview resource to the target area of the second page according to the preset movement effect comprises:
moving the multimedia preview resource to the target area of the second page according to a preset movement path, and/or a preset movement mode, and/or a preset movement processing mode, and
wherein in a case where the multimedia preview resource comprises an image, the method further comprises determining the preset movement path for the multimedia preview resource according to the following:
determining motion information corresponding to an entity in the image; and
determining, among a plurality of preset movement paths, a preset movement path matching the motion information as the preset movement path for the multimedia preview resource.

2. The method according to claim 1,
wherein a size of the target area is greater than the size of the card unit, and
wherein moving the multimedia preview resource to the target area of the second page according to the preset movement effect further comprises:
in a case where the size of the multimedia preview resource is equal to the size of the card unit, performing zooming-in processing on the first content, and translating the first content to the target area of the second page according to the preset movement path; and
completing the zooming-in processing when the multimedia preview resource is moved to the target area, wherein the first content after the zooming-in processing is the second content.

3. The method according to claim 1,
wherein moving the multimedia preview resource to the target area of the second page according to the preset movement effect further comprises:
in a case where the size of the multimedia preview resource is greater than the size of the card unit, displaying, during a process of translation according to the preset movement path, content other than the first content in the multimedia preview resource gradually, and
wherein content being displayed when the multimedia preview resource is moved to the target area is the second content of the multimedia preview resource.

4. The method according to claim 1, wherein moving the multimedia preview resource to the target area of the second page according to the preset movement effect further comprises:
acquiring a display animation corresponding to the multimedia preview resource; and
playing the display animation in the target area of the second page, and displaying the second content of the multimedia preview resource after the playing of the display animation ends.

5. The method according to claim 1, wherein in response to the trigger operation for the card unit, moving the multimedia preview resource to the target area of the second page according to the preset movement effect, further comprises:

in response to the trigger operation for the card unit, displaying a page frame corresponding to the second page; and determining a target area in the page frame for the multimedia preview resource, and moving the multimedia preview resource to the target area according to the preset movement effect, wherein the page frame, the second content and the detail content corresponding to the multimedia preview resource constitute the second page.

6. The method according to claim 1, wherein in a case where the multimedia preview resource is a book introduction, displaying the second content of the multimedia preview resource in the target area of the second page and displaying, in the another area of the second page, the detail content corresponding to the multimedia preview resource, comprises:

displaying the book introduction in the target area of the second page, and displaying, in another area of the second page, chapter content of a target book corresponding to the book introduction.

7. A computer device, comprising: a processor, a memory; and a bus, wherein the memory stores machine-readable instructions executable by the processor, when the computer device is running, the processor communicates with the memory via the bus, and when the machine-readable instructions are executed by the processor, the computer device is caused to:

display at least one card unit in a first page, wherein the card unit displays first content of a multimedia preview resource, and a size of the multimedia preview resource is greater than or equal to a size of the card unit;

in response to a trigger operation for the card unit, move the multimedia preview resource to a target area of a second page according to a preset movement effect; and display second content of the multimedia preview resource in the target area of the second page, and display, in another area of the second page, detail content corresponding to the multimedia preview resource, wherein the second content comprises the first content, wherein the computer device being caused to move the multimedia preview resource to the target area of the second page according to the preset movement effect comprises being caused to:

move the multimedia preview resource to the target area of the second page according to a preset movement path, and/or a preset movement mode, and/or a preset movement processing mode, and wherein in a case where the multimedia preview resource comprises an image, the computer device is further caused to determine the preset movement path for the multimedia preview resource according to the following:

determining motion information corresponding to an entity in the image; and determining, among a plurality of preset movement paths, a preset movement path matching the motion information as the preset movement path for the multimedia preview resource.

8. The computer device according to claim 7, wherein a size of the target area is greater than the size of the card unit, and wherein the computer device being caused to move the multimedia preview resource to the target area of the second page according to the preset movement effect further comprises being caused to:

in a case where the size of the multimedia preview resource is equal to the size of the card unit, perform zooming-in processing on the first content, and translate the first content to the target area of the second page according to the preset movement path; and complete the zooming-in processing when the multimedia preview resource is moved to the target area, wherein the first content after the zooming-in processing is the second content.

9. The computer device according to claim 7, wherein the computer device being caused to move the multimedia preview resource to the target area of the second page according to the preset movement effect further comprises being caused to:

in a case where the size of the multimedia preview resource is greater than the size of the card unit, display, during a process of translation according to the preset movement path, content other than the first content in the multimedia preview resource gradually, and wherein content being displayed when the multimedia preview resource is moved to the target area is the second content of the multimedia preview resource.

10. The computer device according to claim 7, wherein the computer device being caused to move the multimedia preview resource to the target area of the second page according to the preset movement effect further comprises being caused to:

acquire a display animation corresponding to the multimedia preview resource; and play the display animation in the target area of the second page, and display the second content of the multimedia preview resource after the playing of the display animation ends.

11. The computer device according to claim 7, wherein the computer device being caused to in response to the trigger operation for the card unit, move the multimedia preview resource to the target area of the second page according to the preset movement effect, further comprises being caused to:

in response to the trigger operation for the card unit, display a page frame corresponding to the second page; and determine a target area in the page frame for the multimedia preview resource, and move the multimedia preview resource to the target area according to the preset movement effect, wherein the page frame, the second content and the detail content corresponding to the multimedia preview resource constitute the second page.

12. The computer device according to claim 7, wherein in a case where the multimedia preview resource is a book introduction, the computer device being caused to display the second content of the multimedia preview resource in the target area of the second page and display, in the another area of the second page, the detail content corresponding to the multimedia preview resource, comprises being caused to:

display the book introduction in the target area of the second page, and display, in another area of the second page, chapter content of a target book corresponding to the book introduction.

13. A non-transitory computer-readable storage medium, wherein a computer program is stored on the computer-readable storage medium, and when the computer program is executed by a processor, the processor is caused to:

display at least one card unit in a first page, wherein the card unit displays first content of a multimedia preview resource, and a size of the multimedia preview resource is greater than or equal to a size of the card unit;

in response to a trigger operation for the card unit, move the multimedia preview resource to a target area of a second page according to a preset movement effect; and display second content of the multimedia preview resource in the target area of the second page, and display, in another area of the second page, detail content corresponding to the multimedia preview resource, wherein the second content comprises the first content, wherein the processor being caused to move the multimedia preview resource to the target area of the second page according to the preset movement effect comprises being caused to:

move the multimedia preview resource to the target area of the second page according to a preset movement path, and/or a preset movement mode, and/or a preset movement processing mode, and wherein in a case where the multimedia preview resource comprises an image, the processor is further caused to determine the preset movement path for the multimedia preview resource according to the following:

determining motion information corresponding to an entity in the image; and determining, among a plurality of preset movement paths, a preset movement path matching the motion information as the preset movement path for the multimedia preview resource.

14. The computer-readable storage medium according to claim 13, wherein a size of the target area is greater than the size of the card unit, and wherein the processor being caused to move the multimedia preview resource to the target area of the second page according to the preset movement effect further comprises being caused to:

in a case where the size of the multimedia preview resource is equal to the size of the card unit, perform zooming-in processing on the first content, and translate the first content to the target area of the second page according to the preset movement path; and complete the zooming-in processing when the multimedia preview resource is moved to the target area, wherein the first content after the zooming-in processing is the second content.

15. The computer-readable storage medium according to claim 13, wherein the processor being caused to move the multimedia preview resource to the target area of the second page according to the preset movement effect further comprises being caused to:

in a case where the size of the multimedia preview resource is greater than the size of the card unit, display, during a process of translation according to the preset movement path, content other than the first content in the multimedia preview resource gradually, and wherein content being displayed when the multimedia preview resource is moved to the target area is the second content of the multimedia preview resource.

* * * * *